United States Patent [19]

Ford

[11] Patent Number: 4,981,601

[45] Date of Patent: Jan. 1, 1991

[54] REDUCING SLUDGING DURING OIL WELL ACIDIZING

[75] Inventor: William G. F. Ford, Duncan, Okla.

[73] Assignee: Halliburton Company, Duncan, Okla.

[21] Appl. No.: 306,967

[22] Filed: Feb. 2, 1989

Related U.S. Application Data

[62] Division of Ser. No. 223,142, Jul. 22, 1988, Pat. No. 4,823,874.

[51] Int. Cl.$^5$ .............................................. E21B 43/27
[52] U.S. Cl. ................................ 252/8.552; 252/8.553
[58] Field of Search ............................ 252/8.553, 8.552

[56] References Cited

U.S. PATENT DOCUMENTS

| | | | |
|---|---|---|---|
| 2,214,363 | 9/1940 | De Simo et al. | 252/8.552 |
| 2,698,294 | 12/1954 | Kelly | 252/8.552 |
| 3,402,770 | 9/1968 | Messenger | 166/40 |
| 3,437,146 | 4/1969 | Everhart et al. | 166/303 |
| 3,794,523 | 2/1974 | Thompson | 134/3 |
| 3,970,148 | 7/1976 | Jones et al. | 166/307 |
| 4,096,914 | 6/1978 | McLaughlin et al. | 166/307 |
| 4,207,193 | 6/1980 | Ford et al. | 252/8.552 |
| 4,442,014 | 4/1984 | Looney et al. | 252/8.553 |
| 4,574,050 | 3/1986 | Crowe et al. | 252/8.553 |
| 4,663,059 | 5/1987 | Ford et al. | 252/8.553 |
| 4,679,631 | 7/1987 | Dill et al. | 166/307 |
| 4,683,954 | 8/1987 | Walker et al. | 166/307 |
| 4,737,296 | 4/1988 | Watkins | 252/8.553 |
| 4,738,789 | 4/1988 | Jones | 252/8.553 |
| 4,823,874 | 4/1989 | Ford | 166/279 |

OTHER PUBLICATIONS

Article entitled "Formation, Effect and Prevention of Asphaltene Sludges During Stimulation Treatments", E. W. Moore et al., Journal of Petroleum Technology, Sep., 1965, pp. 1023-1028.

Primary Examiner—Robert L. Stoll
Assistant Examiner—Gary L. Geist
Attorney, Agent, or Firm—Clifford C. Dougherty, III; James R. Duzan; Thomas R. Weaver

[57] ABSTRACT

An improved method and composition for reducing the production of sludge when contacting a subterranean formation containing oil which is subject to sludging with an aqueous acid solution. An anti-sludging agent such as a quaternary ammonium salt of a fatty amine, and one or more other additives are combined with the aqueous acid solution along with a dispersing agent which forms the aqueous acid solution and additives into a long-term homogeneous composition.

9 Claims, No Drawings

REDUCING SLUDGING DURING OIL WELL ACIDIZING

This is a Divisional of application Ser. No. 223,142, filed July 22, 1988 now Pat. No. 4,823,874.

BACKGROUND OF THE INVENTION

1. Field of the Invention

The present invention relates to a method and composition for reducing the production of sludge upon acid contact with sludging crude oil, and more particularly, to an improved sludge inhibiting acidizing composition and method of use.

2. Description of the Prior Art

The treatment of a hydrocarbon-containing subterranean formation with an aqueous acid solution is a commonly used technique for stimulating the production of hydrocarbons from the formation. Such a treatment generally includes the pumping of an aqueous acid solution into the formation to dissolve acid soluble materials and produce enlarged flow channels therein whereby the permeability of the formation is increased. The increased permeability allows a greater rate of hydrocarbons to flow through the formation and into the well bore penetrating the formation.

Certain crude oils contained in subterranean formations produce sludge upon contact with aqueous acid solutions during the carrying out of acidizing treatments. The sludge formed is an asphalt-like material which precipitates in the formations and often plugs or clogs the enlarged flow channels formed therein. The treated formations are very slow to clean up, if at all, and often the acidizing treatments produce a decrease in permeability and reduction in oil production instead of an increase therein.

Studies of sludging crude oils and their reactions with acids have shown that the precipitates formed are mainly asphaltenes, resins, paraffins and other high molecular weight hydrocarbons which, once formed, are very difficult to remove from subterranean formations. An explanation of why and how sludges are formed and some methods of sludge prevention are described in the article entitled "Formation, Affect and Prevention of Asphaltene Sludges During Stimulation Treatments" by E. W. Moore et al., *Journal of Petroleum Technology*, September, 1965, pages 1023–1028.

Methods for preventing or reducing sludge formation upon contact between sludging oils and aqueous acid solutions have been developed and used heretofore. Such methods include combining certain anti-sludging agents and other additives with the aqueous acid solution whereby the formation of sludge is inhibited when the resulting acid mixture contacts sludging crude oils While such techniques and acid mixtures have achieved varying degrees of success, the anti-sludging agents and other additives included in the acid mixtures have often separated even though various dispersants have been included therein. When the resulting non-homogeneous acid mixtures have contacted sludging oils in subterranean formations, separated portions of the acid mixtures have still caused the precipitation of sludge in the formations.

By the present invention an improved acidizing method and long-term homogeneous acid composition are provided whereby the production of sludge is effectively reduced.

SUMMARY OF THE INVENTION

A method of reducing the production of sludge when contacting a subterranean formation containing oil which is subject to sludging with an aqueous acid solution is provided. In accordance with the invention, an anti-sludging agent and one or more other additives are combined with the aqueous acid solution along with a dispersing agent which forms the resulting mixture into a long-term homogeneous composition. The homogeneous composition is then utilized to contact the subterranean formation.

The dispersing agent is comprised of an ethoxylated alkyl phenol dissolved in a mixture of ethylene glycol, methanol and water. The ethoxylated alkyl phenol preferably has from 6 to 10 carbon atoms in the alkyl substituent and has been reacted with from about 1 to about 30 moles of ethylene oxide.

Once formed, the aqueous acid composition of this invention remains in a homogeneous state, i.e., no separation of components occurs for at least four hours. Further, because of the long-term homogeneity of the composition, it has superior effectiveness in reducing the production of sludge when in contact with a sludging oil.

It is, therefore, a principal object of the present invention to provide an improved method of reducing the production of sludge when contacting a subterranean formation containing oil which is subject to sludging with an aqueous acid composition.

A further object of the present invention is the provision of an improved homogeneous aqueous acid composition which reduces the production of sludge upon contact with a sludging oil.

Other and further objects, features and advantages of the present invention will be readily apparent to those skilled in the art upon a reading of the description of preferred embodiments which follows.

DESCRIPTION OF THE PREFERRED EMBODIMENTS

In accordance with the present invention, an anti-sludging agent and one or more other additives are combined with an aqueous acid solution along with a dispersing agent whereby the resulting mixture is formed into a long-term homogeneous composition. The term "long-term homogeneous composition" is used herein to mean a mixture which does not separate into individual components or phases for a time period of at least four hours. When the long-term homogeneous acid composition contacts a sludging crude oil, sludge is either not formed or substantially reduced to an acceptable level.

Various kinds and concentrations of aqueous acid solutions can be utilized for carrying out subterranean formation acidizing treatments. Commonly used acids include hydrochloric acid, hydrofluoric acid, organic acids and mixtures of such acids. Aqueous solutions of the acids at concentrations of from about 5% to about 28%–30% by weight can be utilized. An about 15% by weight aqueous hydrochloric acid solution is particularly suitable for use in accordance with the present invention.

A variety of anti-sludging agents can be combined with the aqueous acid solutions to inhibit the production of sludge when sludging crude oils are contacted therewith. Examples of such anti-sludging agents are organic sulfonic acids and/or sulfates dissolved in alcohol solvents, mixtures of organic esters and alcohols, and quaternary ammonium salts. Of these, quaternary ammonium salts such as the quaternary ammonium salts of a fatty amine having an average of 12 to 18 carbon atoms, and preferably an average of 12 to 14 carbon atoms, are the most preferred.

In addition to an anti-sludging agent, other additives including a metal corrosion inhibitor, a non-emulsifier, and an iron control agent are preferably included in the aqueous acid mixture. The metal corrosion inhibitor functions to prevent metallic tubular goods and other metal parts from being corroded by acid contact, and any of the various corrosion inhibitors known in the art which do not adversely react with the other components of the aqueous acid mixture can be utilized. Particularly suitable such corrosion inhibitors are those marketed under the trade names HAI-65, HAI-75 and HAI-85 by Halliburton Services, a Division of Halliburton Company, of Duncan, Okla., which are generally comprised of mixtures of acetylenic alcohols, quaternized heterocyclic amines, dispersants and optionally inorganic salts.

The non-emulsifier is included in the aqueous acid mixture to prevent the formation of water-oil emulsions in the formation being treated. A preferred such non-emulsifier additive is comprised of one or more alkyl aryl sulfonic acids having in the range of from about 8 to 18 carbon atoms in the alkyl group and in the range of from about 6 to 12 carbon atoms in the aryl group.

The iron control agent functions to prevent iron dissolved in the aqueous acid mixture from precipitating. That is, the iron control agent prevents ferric iron from forming precipitants. Suitable iron control agents are disclosed in U.S. Pat. Nos. 4,683,954; 4,679,631 and 4,574,050, which are incorporated herein by reference. Of the various such iron control additives which can be utilized, a mixture comprised of about 30% to 50% by weight hydroxyl amine hydrochloride, about 20% to 40% by weight citric acid, about 10% to 40% by weight glucono delta lactone and about 0.5% by weight cupric chloride is preferred.

In accordance with the present invention, the aqueous acid mixture containing an anti-sludging agent and one or more of the other additives described above is formed into a long-term homogeneous composition by combining therewith a dispersing agent comprised of an ethoxylated alkyl phenol dissolved in a mixture of ethylene glycol, methanol and water. Preferably, the alkyl substituent of the ethoxylated alkyl phenol has from 6 to 10 carbon atoms, and the compound has been reacted with from about 1 to about 30 moles of ethylene oxide, most preferably 20 moles of ethylene oxide. The ethylene glycol-methanol-water mixture in which the ethoxylated alkyl phenol is dissolved preferably includes ethylene glycol in an amount in the range of from about 5% to about 10% by weight of the solvent, methanol in an amount in the range of from about 3% to about 7% by weight of the solvent with the remainder being water. The ethoxylated alkyl phenol compound is preferably dissolved in the solvent in an amount in the range of from about 50% to about 75% by weight of the resulting solution.

The most preferred dispersing agent of the present invention is comprised of an about 70% by weight solution of 20 mole ethoxylated nonyl phenol in an ethylene glycolmethanol-water solvent containing about 7% by weight ethylene glycol and 5% by weight methanol.

The anti-sludging agent utilized is preferably combined with the aqueous acid solution in an amount in the range of from about 1% to about 10% by weight of aqueous acid solution. The dispersing agent, i.e., the ethoxylated alkyl phenol solution is combined with the aqueous acid solution containing the anti-sludging agent and one or more other additives of the type described above in an amount in the range of from about 1% to about 20% by weight of aqueous acid solution.

A preferred sludge inhibiting acid composition of the present invention is comprised of an aqueous acid solution, an anti-sludging agent combined with the aqueous acid solution in an amount in the range of from about 1% to about 10% by weight of the aqueous acid solution, and a dispersing agent comprised of an ethoxylated alkyl phenol dissolved in a mixture of ethylene glycol, methanol and water present in an amount in the range of from about 2% to about 20% by weight of aqueous acid solution The ethoxylated alkyl phenol preferably has from 6 to 10 carbon atoms in the alkyl substituent and has been reacted with from about 1 to about 30 moles of ethylene oxide.

When a metal corrosion inhibitor is included in the composition, it is preferably present therein in an amount in the range of from about 0.1% to about 2% by weight of the aqueous acid solution. When a non-emulsifier is included, it is preferably present in an amount in the range of from about 0.1% to about 2% by weight of the acid solution, and when an iron control agent is included, it is preferably present in an amount in the range of from about 0.5% to about 2.5% by weight of the acid solution.

A particularly preferred sludge inhibiting acid composition of the present invention is comprised of about 15% by weight aqueous hydrochloric acid solution; an anti-sludging agent comprised of a quaternary ammonium salt of a fatty amine having an average of from 12 to 14 carbon atoms present in an amount of about 0.5% by weight of aqueous acid solution; a corrosion inhibitor comprised of a mixture of acetylenic alcohols, quaternized heterocyclic amines, dispersants and inorganic salts present in an amount of about 0.3% by weight of the acid solution; a non-emulsifier comPrised of one or more alkyl aryl sulfonic acids having about 8 to 18 carbon atoms in .the alkyl group and about 6 to 12 carbon atoms in the aryl group present in an amount of about 1% by weight of the acid solution; an iron control agent comprised of about 30% to 50% by weight hydroxyl amine hydrochloride, about 20% to 40% by weight citric acid, about 10% to 40% by weight glucono delta lactone and about 0.5% by weight cupric chloride present in an amount of about 0.5% by weight of the acid solution; and a dispersing agent comprised of an about 70% by weight solution of 20 mole ethoxylated nonyl phenol dissolved in an ethylene glycol-methanolwater solvent containing about 7% by weight ethylene glycol and about 5% by weight methanol, the dispersing agent being present in an amount of about 10% by weight of the aqueous acid solution.

In order to further illustrate the invention, the following example is given.

EXAMPLE 1

50 ml samples of a 15% by weight aqueous hydrochloric acid solution containing 0.3% by volume of a corrosion inhibitor comprised of a mixture of acetylenic alcohols, quaternized heterocyclic amines, dispersants and inorganic salts were placed in containers equipped with magnetic stirrers. The various additives indicated in Table I below were combined with the acid solution samples and uniformly blended. 5000 mpl of ferric iron were added to each blend and each blend was allowed to remain static for 4 hours at ambient conditions. At the end of the 4 hour time periods, the blends were inspected for separation of components.

Those blends which did not separate after 4 hours were next divided into equal parts and each part was mixed with an equal amount of sludging crude oil. The first part-crude oil mixtures were placed in 200° F. oil baths for live acid sludging tests. Marble chips were added to the second part-crude oil mixtures so that the acid in the mixtures spent on the marble chips, and the resultant spent acid mixtures were placed in 200° F. oil baths for spent acid sludging tests. After 2 hours each mixture was removed from the oil bath and poured through a 100-mesh screen to detect any sludge that was formed.

Separation and sludging tests like those described above were performed using a blend containing 15% by weight aqueous hydrochloric acid solution and 0.3% by volume metal corrosion inhibitor only, and using a blend including additives but without the 5000 mpl of ferric iron. Also, a blend containing twice the quantity of additives and ferric iron was tested. The results of these tests are given in Table I below.

TABLE I

| Acid Solution Sample[1] | Additives in Sample | Quantity of Additives in Sample | Separation Test | Sludge Test Live Acid | Sludge Test Spent Acid |
|---|---|---|---|---|---|
| 1 | No additional additives | — | Separation occurred | — | — |
| 2 | Anti-Sludging Agent[2] | 4% by wt. | Separation occurred | — | — |
|   | Non-emulsifier[3] | 1% by wt. |   |   |   |
|   | Iron Control Agent[4] | 0.5% by wt. |   |   |   |
|   | Ferric Iron | 5000 mpl |   |   |   |
| 3 | Anti-Sludging Agent[2] | 4% by wt. | No Separation | No Sludge | No Sludge |
|   | Non-emulsifier[3] | 1% by wt. |   |   |   |
|   | Iron Control Agent[4] | 0.5% by wt. |   |   |   |
|   | Ferric Iron | 5000 mpl |   |   |   |
|   | Dispersing Agent[5] | 10% by wt. |   |   |   |
| 4 | Anti-Sludging Agent[2] | 4% by wt. | No Separation | No Sludge | No Sludge |
|   | Non-emulsifier[3] | 1% by wt. |   |   |   |
|   | Iron Control Agent[4] | 0.5% by wt. |   |   |   |
|   | Ferric Iron | None |   |   |   |
|   | Dispersing Agent[5] | 10% by wt. |   |   |   |
| 5 | Anti-Sludging Agent[2] | 8% by wt. | No Separation | No Sludge | No Sludge |
|   | Non-emulsifier[3] | 1% by wt. |   |   |   |
|   | Iron Control Agent[4] | 1% by wt. |   |   |   |
|   | Ferric Iron | 10,000 mpl |   |   |   |
|   | Dispersing Agent[5] | 20% by wt. |   |   |   |

[1] 15% by wt. aqueous HCl solution containing 0.3% by volume corrosion inhibitor
[2] Quaternary ammonium salt of a fatty amine having an average of from 12 to 14 carbon atoms
[3] Alkyl aryl sulfonic acid
[4] Mixture of about 30%–50% by wt. hydroxyl amine hydrochloride, about 20%–40% by wt. citric acid, about 10%–40% by wt. glucono delta lactone and about 0.5% by wt. cupric chloride
[5] About 70% by wt. 20 mole ethoxylated nonyl phenol in solvent comprised of about 7% by wt. ethylene glycol, about 5% by wt. methanol with the remainder being water.

From Table I it can be seen that the compositions of the present invention maintain long-term homogeneity and effectively prevent the formation of sludge.

While that which applicant presently considers to be the preferred embodiment of the present invention has been described herein, it is to be understood that changes and modifications can be made to the method and composition without departing from the spirit or scope of the invention as defined by the appended claims.

What is claimed is:

1. A long-term homogeneous sludge inhibiting acid composition for acid stimulating a subterranean formation containing oil which is subject to sludging comprising a mixture of an aqueous acid solution, an anti-sludging agent of the type that inhibits precipitation of asphaltic sludge material upon contact of said oil with said aqueous acid solution, said anti-sludging agent being a quaternary ammonium salt of a fatty amine having an average of from 12 to 18 carbon atoms, and a dispersing agent comprised of an ethoxylated alkyl phenol dissolved in a solvent comprised of a mixture of ethylene glycol, methanol and water, the ethoxylated alkyl phenol having from 6 to 10 carbon atoms in the alkyl substituent and having been reacted with from about 1 to about 30 moles of ethylene oxide.

2. The composition of claim 1 wherein said ethylene glycol is present in said solvent in an amount in the range of from about 5% to about 10% by weight of said solvent, said methanol is present therein in an amount in the range of from about 3% to about 7% by weight of said solvent with the remainder being water.

3. The composition of claim 2 wherein said ethoxylated alkyl phenol is dissolved in said solvent in an amount in the range of from about 50% to about 75% by weight of the resulting solution.

4. The composition of claim 1 wherein said dispersing agent is an about 70% by weight solution of 20 mole ethoxylated nonyl phenol in an ethylene glycol-methanol-water solvent containing about 7% by weight ethylene glycol and about 5% by weight methanol.

5. The composition of claim 4 wherein said aqueous acid solution is a 15% by weight aqueous hydrochloric acid solution, and wherein said anti-sludging agent is present in said composition in an amount in the range of from about 1% to about 10% by weight of said acid solution.

6. The composition of claim 5 which is further characterized to include a metal corrosion inhibitor comprised of a mixture of acetylenic alcohols, quaternized heterocyclic amines, dispersants and optionally inorganic salts present in said composition in an amount in the range of from about 0.1% to about 2% by weight of said acid solution.

7. The composition of claim 6 which is further characterized to include a non-emulsifier comprised of an alkyl aryl sulfonic acid having from about 8 to 18 carbon atoms in the alkyl group and from about 6 to 12 carbon atoms in the aryl group present in said composition in an amount in the range of from about 0.1% to about 2% by weight of said acid solution.

8. The composition of claim 7 which is further characterized to include an iron control agent comprised of a mixture of about 30% to 50% by weight hydroxyl amine hydrochloride, 20% to 40% by weight citric acid, 10% to 40% by weight glucono delta lactone and 0.5% by weight cupric chloride.

9. The composition of claim 8 wherein said iron control agent is present in said composition in an amount in the range of from about 0.5% to about 2.5% by weight of said acid solution.

* * * * *

UNITED STATES PATENT AND TRADEMARK OFFICE
CERTIFICATE OF CORRECTION

PATENT NO. : 4,981,601

DATED : January 1, 1991

INVENTOR(S) : William G. F. Ford

It is certified that error appears in the above-identified patent and that said Letters Patent is hereby corrected as shown below:

In Column 1, line 55, after "oils" insert _. ._

In Column 4, line 41, delete "comPrised" and insert _comprised_.

In Column 4, line 54, delete "methanolwater and insert _methanol-water_.

In Column 6, line 4, after solution, insert "_said aqueous acid solution including hydrochloric acid,_".

In Column 7, line 2, delete "corrosiOn" and insert _corrosion_.

In Column 7, line 3, delete "alcohOls" and insert _alcohols_.

Signed and Sealed this

Eighth Day of December, 1992

Attest:

DOUGLAS B. COMER

Attesting Officer

Acting Commissioner of Patents and Trademarks